Dec. 7, 1943.  D. E. OLSHEVSKY  2,335,876
DIRECTIONAL GYROSCOPE INDICATOR
Filed Jan. 20, 1940  2 Sheets-Sheet 1
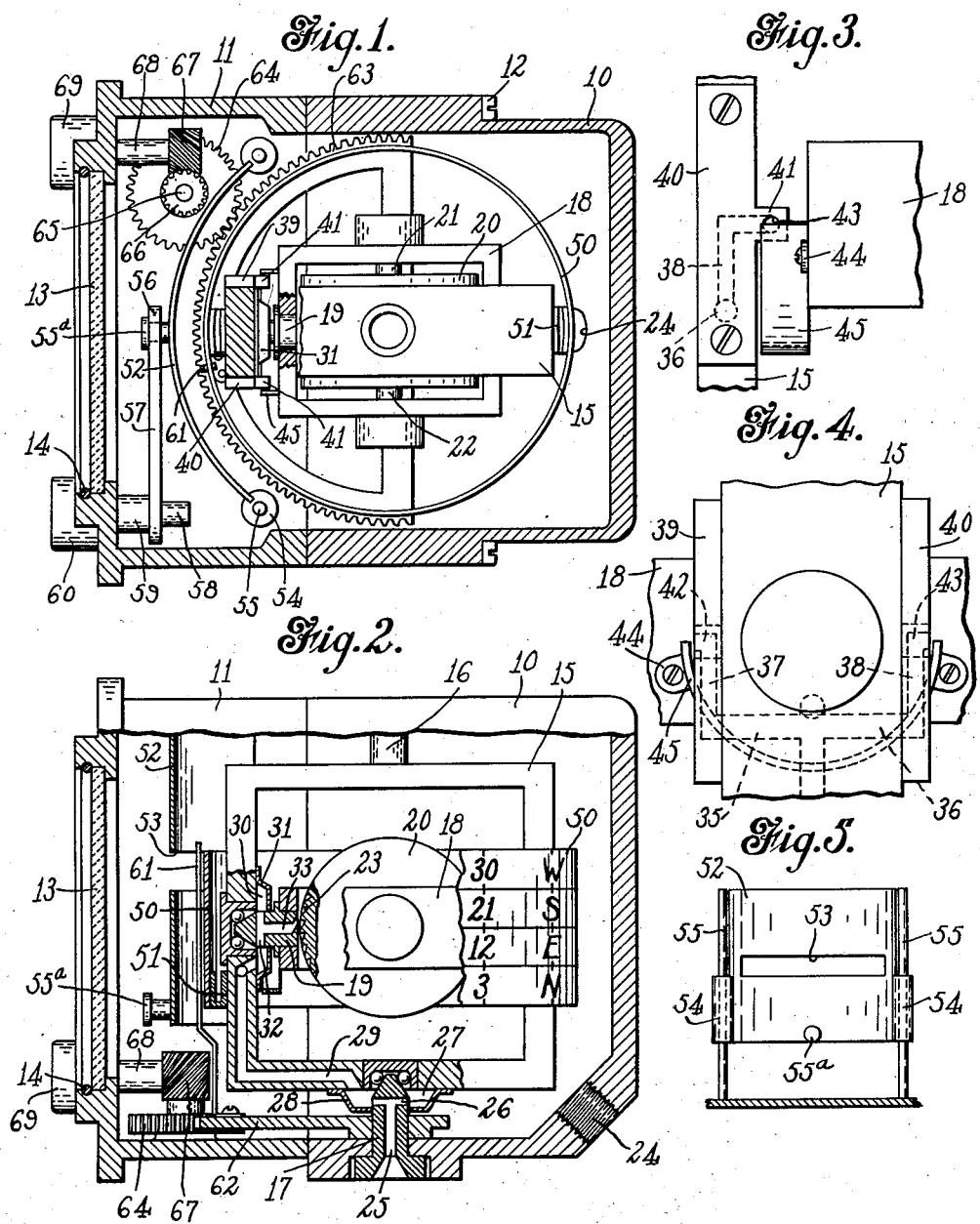
Inventor
Dimitry E. Olshevsky
By Rockwell Bartholow
Attorneys Dec. 7, 1943.    D. E. OLSHEVSKY    2,335,876
DIRECTIONAL GYROSCOPE INDICATOR
Filed Jan. 20, 1940    2 Sheets-Sheet 2
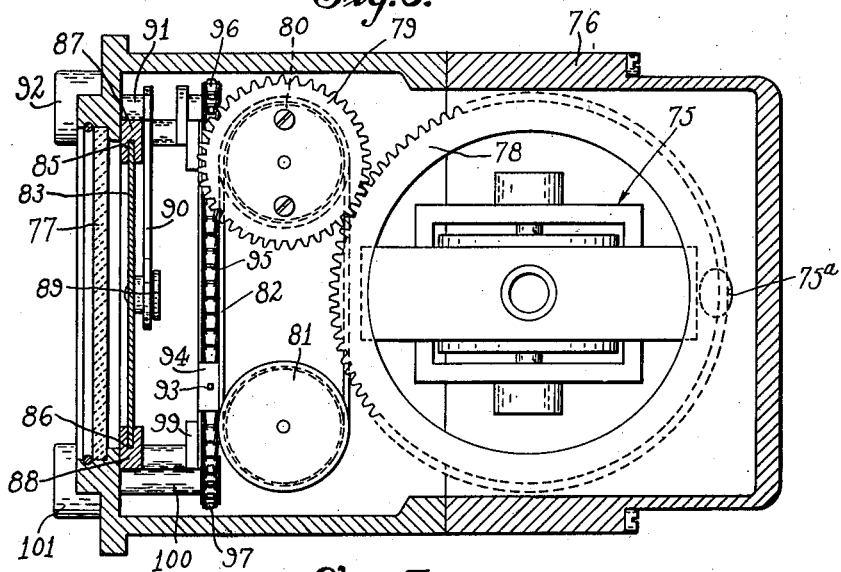
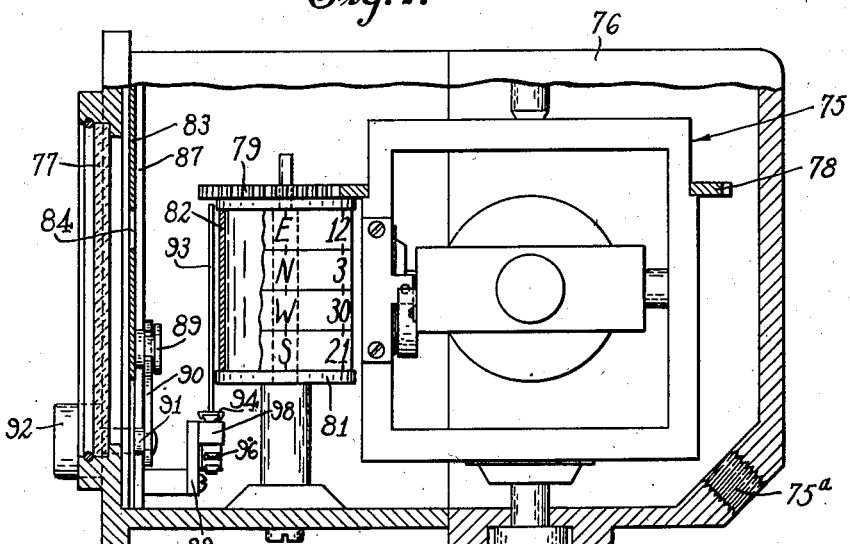
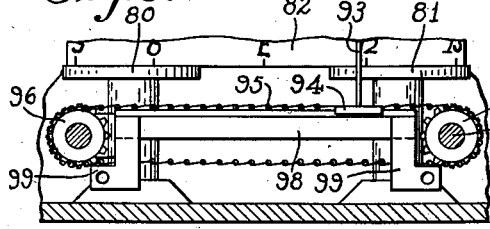

Patented Dec. 7, 1943

2,335,876

UNITED STATES PATENT OFFICE 2,335,876

DIRECTIONAL GYROSCOPE INDICATOR

Dimitry E. Olshevsky, Stratford, Conn.

Application January 20, 1940, Serial No. 314,833

9 Claims. (Cl. 33—204)

This invention relates to gyroscopic instruments and more especially to the type of instrument known as the drectional gyroscope which is used as a course indicator for purposes of navigation, particularly on air craft although it may be used on other types of vessels as well.

In the past it has been the general practice in setting a definite course, either to change the position of the entire gyroscope or to reset with respect to the gyroscope a course identification means, such as a compass card, usually mounted upon or controlled by the gyroscope. The gyroscope may either be reset bodily or slowly caused to precess into the course setting which is desired, but when the indicating means is changed it is necessary to disengage this means from the gyroscope, reset it and again engage it so that its position may be controlled by the gyroscope. All of the above methods disturb the gyroscope directly or indirectly and complicate the structure and have certain disadvantages for this reason.

It is contemplated by the present invention to provide means for changing the course setting without resetting or changing the position of the gyroscope itself and also without changing the position of the course indicating means controlled by the gyroscope. In the present instance, the course indicating means is designed as is usually the case, to be read against a so-called lubber line or course marker, and in changing the course setting the lubber line or marker is moved with respect to the indicating means, which may be in the form of a compass card, in order to obtain the true course setting. As the marker is carried by the case or the stationary mounting means for the gyroscope, its movement does not disturb the latter and the present construction thus avoids the disadvantages present in previous devices used for a similar purpose.

One object of the present invention is to provide a direction indicator which will overcome the disadvantages referred to and will eliminate entirely the resetting or any manipulating of course identification means carried by the gyroscopic system.

A further object of the invention is the provision in a gyroscopic indicator of means for setting a definite course by the provision of a plurality of course lanes any one of which may be selected at will for observation, and a movable marker or lubber line to be read against the graduations on the selected lane whereby the setting of any desired course may be achieved without disturbance of the gyroscope system.

A still further object of the invention is to provide means for quickly resetting the direction indicator to a course which is a multiple of 90 degrees off the original course for which the indicator was previously set, that is, a course 90, 180 or 270 degrees, for example, off the previous course.

Another object of the invention is the provision in a course indicator of means showing the same relationship between the motion of the course marks and the lubber line as exists between natural marks on the horizon and any reference datum on the vessel.

To these and other ends the invention consists in the novel features and combinations of parts to be hereinafter described and claimed.

In the accompanying drawings:

Fig. 1 is a top plan view of a directional gyroscope, certain parts being shown in section for the sake of clearness;

Fig. 2 is a side view of the gyroscope with certain parts shown in section;

Fig. 3 is a detail view of the means for maintaining the gyroscope rotor axis in a horizontal plane;

Fig. 4 is an end view of the parts shown in Fig. 3;

Fig. 5 is a detail view of the selecting shield to expose for observation one only of the various sets or lanes of course markings;

Fig. 6 is a top plan view of a directional gyroscope of slightly modified form, the case being shown in section;

Fig. 7 is a side elevational view of the gyroscope shown in Fig. 6; and

Fig. 8 is a detail view of the course-identifying means of the gyroscope shown in Figs. 6 and 7.

As illustrated, the gyroscope is of the air driven type and is mounted in an airtight casing 10, having a front portion 11, secured by the screws 12. In the front portion is an observation window through which the indicating means and lubber line or marker may be observed, the window being constituted by a transparent member 13 of glass or other suitable substance, which may be held in place in any convenient manner, such as by the ring 14.

The gyroscope proper comprises a vertical ring 15, supported in suitable vertical bearings 16 and 17, carried by the casing 10. Within the vertical ring is a horizontal rotor supporting ring 18, supported on horizontal bearings 19 (only one of which is shown), carried by the vertical ring. The rotor is designated at 20 and is supported on horizontal bearings 21 and 22 in the horizontal ring 18, the axis of the rotor being, of course, at right angles to the axis about which the horizontal ring 18 is free to revolve.

As stated, the rotor is of the air driven type and may be provided with teeth or vanes 23 adjacent its central portion against which a current of air may impinge to cause the rotor to spin. The case 10 is provided with an opening 24, through which air may be exhausted and air is permitted to enter a passage leading to the rotor teeth 23 through the bore 25 of the lower bearing member 17, which is hollow for this purpose. At the upper portion of the bore 25 horizontal openings 26 may be provided admitting air to a chamber 27 formed by a cap 28, secured on the ring 15, which cap prevents leakage of air into the casing but allows the air to pass upwardly through the conduit 29 of the ring 15 into a chamber 30 formed by the cap 31, secured to the ring 15, about the horizontal bearing 19. The space within the chamber 30 communicates with openings 32 which lead to the bore 33 of the hollow bearing 19, and thence against the rotor teeth 23, as shown in Fig. 2, the current of air being induced by suction through the opening 24.

As is well known, there is a tendency for the horizontal ring to move out of the horizontal plane and it is, therefore, desirable to provide means for automatically maintaining this ring in the horizontal plane in the event that it moves away from it. As shown in Fig. 4, the passage 29 in the vertical ring 15 is provided with lateral branches 35 and 36, leading to opposite edges of the ring 15 where these branches communicate respectively with passages 37 and 38 provided in plates 39 and 40, secured to the side faces of the ring. As shown in Figs. 3 and 4, each of these plates is provided with a lug 41 projecting inwardly toward the horizontal ring through which lugs the passages 37 and 38 communicate with the interior of the casing through openings 42 and 43.

Secured to the horizontal ring 18 by means of screws 44 is a semi-circular shield or screen 45, shown more especially in Figs. 3 and 4, this screen being adapted to intercept the air issuing from the openings 42 and 43, and turning with the horizontal ring 18 if it should swing from the horizontal plane.

It will be obvious that if this ring swings from the horizontal plane, one or the other of the openings 42 or 43 will be uncovered and the other closed. The jet issuing from the uncovered opening will cause a reaction tending to swing the vertical ring 15. This tendency will, of course, be resisted and the result will be to restore the horizontal ring to its proper position. It will be apparent from Figs. 3 and 4 that the arrangement of the openings 42 and 43 and the screen 45 is such that the swinging of the horizontal ring of the gyroscope will not be mechanically inhibited, and that in every position except the true horizontal position one of the openings will be uncovered and the other covered, thus bringing about the reaction necessary to restore the ring to its proper position.

In order to indicate the position or azimuth of the vertical ring 15 of the gyroscope with respect to the vessel upon which it is mounted, I have provided an indicating device which is designed to be controlled in its movement by the gyroscope, which indicating device consists of a plurality of course indicating means or graduated course lanes, the markings upon each lane being staggered or shifted with respect to those of an adjacent lane. As shown, the compass markings upon each set of indicating means are shifted ninety degrees from the markings on the adjacent lanes.

In the form of my invention shown in Figs. 1 to 5, this indicating device comprises a carrier in the form of an annular member or card 50 secured by members 51 to the vertical ring 15, and as will be seen from Fig. 2 there are upon this member four sets of course lanes or compass markings, the markings upon each of the lower lanes being ninety degrees off the markings of the next upper lane. The member 50 extends about the ring 15 so as to be visible through the transparent window 13 at the front of the case 10.

In order that only one of the lanes may be exposed for observation at one time, a shield 52 is provided between the window 13 and the member 50, this shield being of arcuate shape and being provided with a slot 53 of the width and length to expose one only of the course markings upon the member 50 and to expose at least ninety degrees of such course markings. The shield 52 may be carried at its side edges by sleeves 54 slidably mounted upon posts 55 upstanding from the case to effect vertical movement of the shield to expose any selected one of the plurality of indicating means on the member 50. The shield 52 may be provided with a post 55ª designed to be received in the fork or slotted end 56 of an arm 57 secured to a shaft 58, rotatably mounted in a sleeve 59, secured to the casing and designed to be operated from the exterior of the casing by the button 60. It will be apparent that by rotation of the button the arm 57 which is normally in a substantially horizontal position, will be swung in a vertical plane and thus raise or lower the shield 52 upon the guide posts 55, thus bringing the slot 53 in registration with any one of the course lanes or indicating means on the compass card 50.

It will be apparent that movement of the shield from one to another of the course lanes will change the setting of the indicator in the form of my device illustrated, an amount of ninety degrees. In order to obtain exact settings a movable lubber line or marker is provided, which may be moved relatively to the compass card 50 an amount of ninety degrees or more, and thus any desired course setting may be obtained. Accordingly, a lubber line or marker 61 is secured to a gear segment 62, rotatably mounted upon the bearing 17, as shown in Fig. 2. Upon its forward edge this segment is provided with teeth 63 engaged with the teeth of a pinion 64, provided on a vertical shaft 65, rotatably carried by the casing. A spiral gear 66 is secured to the shaft 65 and the teeth of this gear are in turn engaged with those of a spiral gear 67 carried by a shaft 68, which extends without the case and terminates in a manually manipulatable button 69. It will be obvious that by turning the button 69 the gear segment 62 is rotated, thus carrying the lubber line or marker 61 laterally past the slot 53 and over the surface of the indicating device 50.

From the above description it will be seen that regardless of the position of the gyroscope itself with respect to the vessel upon which it is mounted, any desired course setting may be obtained by the manipulation of the buttons 60 and 69.

The button 60 is rotated to move the shield 52 vertically so as to select any desired set of compass markings or course lane on the compass card 50. This will expose for observation the compass markings which are the nearest to the desired course and within ninety degrees of such course, then by manipulating the button 69 the lubber line or marker 61 may be moved across the exposed portion of the compass card 50 to obtain the true exact setting. Thus, any desired course may be set without regard to the position of the gyroscope itself and without disturbing any part of the gyroscopic system. Moreover, it will also be apparent that a change from any given course to a course at 90°, 180° or 270° of the original can be immediately made by shifting the shield 52 without resetting the lubber line.

In Figs. 6 to 8 of the drawings I have shown a somewhat modified form of my invention, the changes particularly relating to the form and operation of the indicating means.

As illustrated, the gyroscope, designated generally by the numeral 75, is of the same form as that previously shown and described, the gyroscope being mounted in an airtight casing 76 having at the front thereof a transparent window 77, and also provided with an exhaust opening 75ª. Secured to the vertical ring of the gyroscope so as to move therewith is a ring gear 78, the teeth of which are in mesh with those of a pinion 79, secured at the top of a spool 80, rotatably mounted upon a vertical axis of the case. Trained around the spool 80 and a companion spool 81, also rotatably mounted in the case in spaced relation with the spool 80, is an indicating member or carrier 82, in the form of an endless band, which may preferably be made of metal. This band will have a plurality of sets of indicating means or course lanes thereon, similar to the indicating means 50 previously described, in that there will preferably be four of such lanes, and the course markings of each lane will be shifted ninety degrees with respect to those of an adjacent lane. It will be apparent that relative movement of the gyroscope and case 76 will effect rotation of the pinion 79 and thus move the band 82 by rotation of the spools 80 and 81. It will, moreover, be apparent that the movement of the gear 79 will be opposite in direction to that of the ring gear 78, thus causing the band 82 to move in the same direction as the landmarks on the horizon upon deviation of the vessel from the prescribed course.

In order that one only of the course markings or lanes upon the band 82 may be observed by the operator at one time, a shield 83 having a slot 84 therein is mounted to slide in vertical guideways 85 and 86, provided in guide blocks 87 and 88, mounted in the case.

The shield 83 is provided with a rearwardly projecting pin 89 which is received in the slotted or forked end of an arm 90 secured to a shaft 91 rotatably mounted in the case and operated by the button 92 disposed exteriorly of the case, so that when the button is rotated the arm 90 will be swung in a vertical plane to move the shield vertically in the guideways 85 and 86.

In this instance a lubber line or marker 93 is supported upon a block 94 in front of the band 82, the block being secured to an endless chain 95 trained over sprocket wheels 96 and 97, so that the lubber line can be moved across the front of the indicator band. A guide bar 98 may be supported in the case on legs 99 to lie below the block 94 so as to maintain the lubber line in a proper vertical position. One of the sprocket wheels 97, as shown in the drawings, is secured to a shaft 100 which extends without the case, and is provided with a manually operable button 101 so that the shaft may be rotated to move the lubber line in a horizontal path relatively to the indicating means 82.

It will be understood that the length of the endless band 82 is so proportioned with relation to the sizes of the gears 78 and 79 that a complete revolution of the gear 78 will effect a complete turn of the band, and it will also be seen that as the rotation of the gear 79 is opposite in direction to that of the gear 78, the deviation of the vessel from its course with respect to the natural landmarks on the horizon will be in the same direction as the deviation from the course which will be indicated by the lubber line on the band 82, instead of in the opposite direction, as is the case with directional gyroscopes now in use.

It will be understood from the foregoing that the shifting of the shield 83 will expose for observation any one of the four lanes or courses on the indicating band 82, which will obviously be the band exposing the indications for the desired setting of the instrument. The precise setting of the instrument is then obtained by movement of the lubber line or marker 93 to the proper position by means of the button 101. The instrument will then be precisely set for the desired course, and this setting will be obtained without any manipulation of the course-identification means carried or controlled by the gyroscopic system.

While I have shown and described some preferred embodiments of my invention, it will be understood that it is not to be limited to all of the details shown, but is capable of modification and variation within the spirit of the invention and within the scope of the appended claims.

What I claim is:

1. In a gyroscopic direction indicator for aircraft and the like, a case, a universally mounted gyroscope, azimuth-defining means comprising a carrier having a plurality of rows of azimuth-defining indicia thereon, said rows being spaced one above the other on said carrier, the azimuth position of said carrier being controlled by the gyroscope, the markings of each row being displaced azimuthally with respect to the markings of an adjacent row, and each row of said indicia covering a range of 360 degrees, means to select and exclusively expose for observation at will a sufficiently wide portion of any predetermined row to enable the pilot by successively exposing portions of all available rows to obtain a range of azimuth designations substantially from zero to 360 degrees at any relative position of said carrier with respect to the case regardless of the heading of the craft, and a movable lubber-line index operable by the pilot to designate a reading on collimation on the exposed row of indicia.

2. In a gyroscopic indicator for aircraft and the like, a case, a universally mounted gyroscope, azimuth-defining means comprising an annular card mounted on said gyroscope and having thereon four rows of compass markings, each row embracing 360 degrees, said rows being spaced vertically on said card, the markings of each row being displaced azimuthally with respect to the markings of an adjacent row by an amount equal to 90 degrees, a vertically movable shield adapted for exclusive revelation of a portion of any row at will having a cut-out portion sufficiently wide to expose at least 90 degrees of said compass markings, and a movable lubber-line index operable by the pilot and having a range of lateral motion substantially equal to or in excess of 90 degrees.

3. In a direction indicator for aircraft and the like, a case, a window in said case, a carrier adjacent said window, a plurality of azimuth-defining means mounted thereon, each of said means being azimuthally displaced a predetermined amount relatively to the others and covering each a range of 360 degrees, said carrier comprising a flexible movable ribbon, means to conceal from view all but a portion of a selected one of said azimuth-defining means whereby any reading within a range from zero to 360° may be exposed at any relative position of said means and said case regardless of the heading of the craft, gyroscopic means controlling the position of said flexible ribbon, and movable means operable by the pilot cooperating with said ribbon to designate a selected reading.

4. In a gyroscopic direction indicator for aircraft and the like, a case, a universally mounted gyroscope, a carrier, a plurality of azimuth-defining means thereon, each of said means being azimuthally displaced a predetermined amount relatively to the others, each comprising 360 degrees, the position of said carrier being controlled by the gyroscope, said carrier comprising a flexible ribbon mounted for translation within its own outline, means to conceal from view all but a predetermined portion of a selected one of said azimuth-defining means whereby any reading within a range from zero to 360° may be exposed at any relative position of said means with respect to said case regardless of the heading of the craft, and movable means operable by the pilot cooperating with said azimuth-defining means to designate a selected heading.

5. In a gyroscopic direction indicator for aircraft and the like, a case, a window in said case, a universally mounted gyroscope, an endless vertically disposed ribbon movably mounted in the case adjacent said window for translation within its own outline in belt-like fashion, azimuth-defining means comprising a plurality of "$n$" horizontal rows of azimuth-defining indicia, said rows being positioned and spaced one above the other on said ribbon, the markings of each row being displaced azimuthally with regard to the markings of an adjacent row by an amount of $360/n$ degrees, and each row of said indicia covering a range of 360 degrees, said ribbon being drivingly controlled by said gyroscope in such a way as to cause the part of it intended for observation to appear to the pilot to move in the same sense with respect to the case window as natural marks upon the true horizon appear to the pilot to move with regard to the windshield of his craft upon turns of said craft, means operable by the pilot to conceal from view all but a portion of a selected one of said rows, and means cooperating with the exposed azimuth-defining means to designate a selected heading.

6. In a gyroscopic direction indicator for aircraft and the like, a case, a window in said case, a universally mounted gyroscope, rotatable drums in said case, an endless flexible ribbon mounted on said drums adjacent said window, a plurality of rows of azimuth-defining indicia on said ribbon each embracing a range of 360°, and the indicia of each row being azimuthally displaced by a predetermined amount from the other rows, a master gear mounted upon said gyroscope, an auxiliary gear mounted upon one of said drums and driven from said master gear, movable means to conceal from view all but a selected one of said rows, and a cooperating movable index operable by the pilot adapted to cooperate with said azimuth-defining indicia to designate a selected reading.

7. In a direction indicator for aircraft or the like, a case, a plurality of azimuth-defining means mounted in the case for substantially horizontal movement, each of said means being azimuthally displaced relatively to the adjacent ones thereof, means to exclude from observation at will all but a portion of a selected one of said azimuth-defining means whereby any reading within a range from zero to 360° may be exposed at any position of said azimuth-defining means relatively to the case regardless of the heading of the craft, a manually operable element movable horizontally of and cooperating with said azimuth-defining means to designate a selected heading thereon, and common means controlling the azimuth position of all said azimuth-defining means.

8. In a direction indicator for aircraft or the like, a case, a plurality of azimuth-defining means mounted in the case for substantially horizontal translatory movement, each of said means being azimuthally displaced relatively to the adjacent ones thereof, means to exclude from observation at will all but a portion of a selected one of said azimuth-defining means whereby any reading within a range from zero to 360° may be exposed at any position of said azimuth-defining means relatively to the case regardless of the heading of the craft, a manually operable element movable in the direction of movement of said azimuth-defining means and cooperating therewith to designate a selected heading thereon, and common means controlling the azimuth position of all said azimuth-defining means.

9. In a direction indicator for aircraft and the like, a case, a universally mounted gyroscope therein having its spin axis in a substantially horizontal plane, a carrier movably mounted in the case, said carrier having mounted thereon a plurality of azimuth-defining means each of which is azimuthally displaced relatively to the others a predetermined amount, means for controlling the azimuth position of said carrier by the gyroscope, means to conceal from view at will all but a portion of a selected one of said azimuth-defining means whereby any azimuth reading within a range from zero to 360° may be exposed at any position of said azimuth-defining means relatively to the case regardless of the heading of the craft, and manually operable means movable along and cooperating with said azimuth-defining means to designate a selected heading.

DIMITRY E. OLSHEVSKY.